United States Patent [19]

Schmitz

[11] 4,310,592
[45] Jan. 12, 1982

[54] N-(2-HYDROXYBENZYL)ALKYLAMINES AS WATER-REPELLANT AGENTS
[75] Inventor: Arthur A. Schmitz, Lagrange, Ill.
[73] Assignee: Akzona Incorporated, Asheville, N.C.
[21] Appl. No.: 201,680
[22] Filed: Oct. 29, 1980
[51] Int. Cl.³ .................... C07C 85/18; B05D 3/02; D04H 1/58; B32B 21/04
[52] U.S. Cl. .................... 428/288; 427/384; 427/394; 427/395; 427/397; 428/289; 428/457; 428/537; 564/390
[58] Field of Search ............ 427/384, 394, 395, 397; 564/390; 428/288, 289, 457, 537

[56] References Cited
U.S. PATENT DOCUMENTS
4,212,822  7/1980  Arold .................... 564/390

*Primary Examiner*—Michael R. Lusignan
*Attorney, Agent, or Firm*—Francis W. Young; Robert F. Green

[57] ABSTRACT

This disclosure relates to a method of increasing the water-repellant properties of a material by treating the surface of the material with a water-repellant agent of the formula

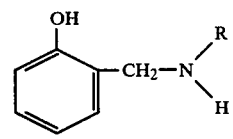

wherein R is $C_{12}$–$C_{22}$ alkyl.

4 Claims, No Drawings

N-(2-HYDROXYBENZYL)ALKYLAMINES AS WATER-REPELLANT AGENTS

This invention relates to a method of increasing the water-repellant properties of a material by treating the material with a water-repellant agent. In particular this invention relates to a method of increasing the water-repellant properties of a material such as, for example, paper, wood, textile fabrics, metal surfaces, and the like upon treatment of the surface of such a material with a N-(2-hydroxybenzyl)alkylamine.

In accordance with the novel aspects of the present invention, the water-repellant properties of a material are increased upon treatment of the material with an effective amount of a water repellant agent selected from a class of compounds represented by the formula

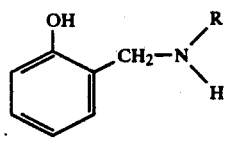  (I)

wherein R is $C_{12}$-$C_{22}$ alkyl.

The alkyl radicals represented by R contain from about 12 to about 22 carbon atoms. Preferably, the alkyl radicals represented by R contain from about 12 to about 18 carbon atoms. The alkyl radicals represented by R comprise radicals derived from natural-occurring fats such as dodecyl, tetradecyl, hexadecyl, octadecyl as well as radicals derived from sythetic sources such as tridecyl and pentadecyl. The term "coco" as used herein refers to a radical derived from the natural occurring fatty acids of the coconut. The term "hydrogenated tallow" indicates a saturated tallow radical. It is most preferred that R is either a coco radical or a hydrogenated tallow radical.

The term "effective amount of a water-repelling agent" refers to an amount of a compound of formula (I) which when applied to a material will increase the water repellant properties of the material. The effective amounts of the water repelling agents of formula (I) are readily ascertainable by one of ordinary skill in the art.

Illustrative of the materials, which when treated with one or more compounds of formula (I), exhibit increased water-repellant properties include, for example, paper, wood, textile fabrics, metallic surfaces and the like. Although the materials may be treated directly with one or more compounds of formula (I) in their concentrated form, typically the surface of the materials is contacted with one or more compounds of formula (I) which are in the form of a solution.

In general, the compounds employed in accordance with the methods of the present invention may be prepared in accordance with one of the following procedures:

Procedure A:

An aliphatic amine of the formula:

R—NH$_2$   (II)

wherein R is above defined; is treated with an aromatic aldehyde of the formula

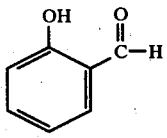  (III)

to yield an imine of the formula:

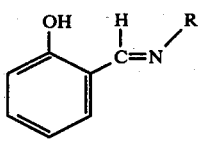  (IV)

Although the reaction of the amine and aldehyde is exothermic, for ease of reaction and maximum production of the imine a temperature range of 80°-90° C. is preferred. Although no solvent is required, an inert solvent such as methanol may be employed for ease of reaction. The imine of formula (IV) is then reduced utilizing techniques such as chemical reduction employing sodium borohydride, or catalytic hydrogenation employing a hydrogenation catalyst such as Raney Nickel to yield an amine of formula (I).

The chemical reduction of the imine of formula (IV) with sodium borohydride is generally carried out at low temperatures, i.e. 0°-20° C., in order to control the reaction rate, in the presence of an inert solvent. The inert solvent should be one in which the imine is soluble or slightly soluble. Selection of such solvents is readily ascertained by one of ordinary skill in the art and includes, for example, methanol, dimethylformamide and the like.

Although not narrowly critical, the catalytic hydrogenation of the imine of formula (IV) employing a catalyst such as Raney Nickel is generally carried out at 80°-90° C.

Procedure B:

An aliphatic amine of formula (II) is treated with formaldehyde and phenol to yield predominately an amine of formula (I).

The formaldehyde employed in Procedure B may be either an aqueous formaldehyde solution or preferably a methanol solution of formaldehyde. Although the temperature of the reaction may vary over a wide range (20°-200° C.) it is preferred to maintain the reaction temperature within a range of 80°-90° C. Furthermore, although no catalyst need be employed, a Lewis acid catalyst, such as acetic acid or p-toluenesulfonic acid may be utilized.

Illustrative of the water repellant agents of formula (I) include for example,

| COMPOUND NO. | COMPOUND |
|---|---|
| 1 | N-(2-hydroxybenzyl)octadecylamine |
| 2 | N-(2-hydroxybenzyl)tetradecylamine |
| 3 | N-(2-hydroxybenzyl)dihydrogenatedtallowamine |
| 4 | N-(2-hydroxybenzyl)cocoamine |

For the purpose of giving those skilled in the art a better understanding of the present invention, the following illustrative, non-limiting examples are given.

EXAMPLE I

A 2 inch by 2 inch square of Whatman No. 40 filter paper was dipped into a water-repellant solution containing a compound of formula (I) in chloroform for 10 seconds. The filter paper was dried and then placed across a beaker. One drop of water was placed on the treated filter paper and the rate of absorbancy was observed. The results are illustrated in Table I.

As used hereinafter in the Tables, "concentration" refers to the percent by weight of a compound of formula (I) in chloroform. Unless otherwise noted, the rate of absorbancy refers to the time in seconds in which the drop of water is absorbed by the material being tested.

TABLE I

| COMPOUND NO. | CONCENTRATION | Rate of Absorbancy |
|---|---|---|
| 1 | 0.2 | 15 |
|   | 0.4 | 25 |
|   | 0.8 | 65 |
|   | 1.0 | 75 |
| 1 | 0.2 | 27* |
|   | 0.4 | 53* |
|   | 0.8 | 130* |
|   | 1.0 | 220* |
| 2 | 1.0 | 60 |
| 3 | 1.0 | 30 |
| 4 | 0.2 | absorbed water almost immediately |
|   | 0.4 | absorbed water almost immediately |
|   | 0.8 | no absorption after 30 minutes |
|   | 1.0 | no absorption after 30 minutes |

*average rate of absorbancy for two samples

EXAMPLE II

A 2 inch by 2 inch square of cotton fabric was dipped into a water-repellant solution containing a compound of formula (I) in chloroform for 10 seconds. The cotton fabric was dried and then placed across a beaker. One drop of water was placed on the treated cotton fabric and the rate of absorbancy was observed. The results are illustrated in Table II.

TABLE II

| COMPOUND NO. | CONCENTRATON | Rate of Absorbancy |
|---|---|---|
| 1 | 0.2 | 90 |
|   | 0.4 | 120 |
|   | 0.8 | greater than 10 mins. |
|   | 1.0 | greater than 20 mins. |
| 4 | 0.2 | less than 1 minute |
|   | 0.4 | 60 |
|   | 0.8 | no absorbancy |
|   | 1.0 | no absorbancy |

EXAMPLE III

Steel coupons (3"×6") were cleaned by washing the coupons with chloroform and then acetone to remove any grease or oil on the surface of the coupons. Each steel coupon was placed on wire pins in separate shallow aluminum trays. To the aluminum trays was added a chloroform solution containing 1% by weight of a compound of formula (I) until the steel coupons were completely immersed in the chloroform solution. A blank was prepared by treating a steel coupon with only chloroform. The steel coupons were left in the chloroform solution for five minutes, then removed, dried and wiped with a paper towel. Tap water was applied to each steel coupon and the water repellancy was observed.

For steel coupons treated with chloroform solutions containing 1% by weight of Compound 1 or Compound 4 "repelled" water immediately and the surface of the steel coupons were almost completely dry. The blank steel coupon treated only with chloroform did not "repell" the water which remained on the steel coupon as a thin film.

The above examples illustrates the effectiveness of the water-repellant agents of the present invention and compositions containing such water repellant agents.

As previously mentioned the water-repellant agents of the present invention may be employed in their concentrated form or they may be formulated in water-repellant compositions with a suitable solvent. Such suitable solvents include, for example, low boiling point solvents in which the compounds of formula (I) are soluble, such as chloroform and alcohols such as methanol and isopropanol as well as hydrocarbons such as petroleum ether. The amount of water-repellant agents of formula (I) employed in the water-repellant compositions utilized in the methods of the present invention is readily ascertained by one of ordinary skill in the art. It is preferred to employ from 0.2% to 1.0% by weight of a water-repellant agent of formula (I) in such compositions and most preferred to employ 0.5% to 1% by weight. Although larger quantities of water-repellant agent may be readily employed, for economics and ease of handling a 1% solution is preferred.

Although the present invention has been described in conjunction with preferred embodiments, it is also understood that modifications and variations may be resorted to without departing from the spirit and scope of the invention as those skilled in the art readily understand. Such modifications and variations are considered to be within the scope of the present invention and claims.

What is claimed is:

1. A method of increasing water repellant properties of a material comprising applying to the material an effective water repellant amount of a compound of the formula

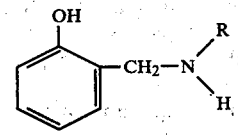

wherein R is $C_{12}-C_{22}$ alkyl.

2. A method according to claim 1 wherein R is $C_{12}-C_{18}$ alkyl.

3. A method according to claim 2 wherein the compound is N-(2-hydroxybenzyl)cocoamine.

4. A method according to claim 2 wherein the compound is N-(2-hydroxybenzyl)octadecylamine.

* * * * *